UNITED STATES PATENT OFFICE.

CHARLES H. FRINGS, OF DENVER, COLORADO, ASSIGNOR OF ONE-HALF TO OTTO ZWIETUSCH, OF MILWAUKEE, WISCONSIN.

AERATED TONIC BEVERAGE.

SPECIFICATION forming part of Letters Patent No. 264,941, dated September 26, 1882.

Application filed March 13, 1882. (No specimens.)

*To all whom it may concern:*

Be it known that I, CHARLES H. FRINGS, a citizen of the United States, residing at Denver, in the county of Arapahoe and State of Colorado, have invented a new and useful Nutrient and Tonic Compound Beverage, to be used as a non-alcoholic substitute for malt liquors, of which the following is a specification.

My compound consists of the following ingredients: an extract of cereals malted or acted upon by malt, an extract of hops or other aromatic or bitter tonics, and carbonic acid, with the addition of other acids, in case the said extracts do not possess the amount of free acids required for the stability of the compound beverage, which ingredients are to be combined in the proportions hereinafter stated.

I prepare and combine, first, the said extracts in about the same manner and the same proportions as brewers prepare and combine their "hopped beer-wort," in which well-known process the mashing operation may be so conducted that more dextrine than maltose is produced, thus preventing an unpleasant sweetness in the resulting beverage without impairing the nutrient properties of the same. The proportion in which cereals and hops are used in the manufacture of malt liquors varies greatly, according to the different kinds of liquors; but it may be stated that for every per cent. of (dry) cereal extract in a barrel of my compound beverage (containing thirty-one gallons) the extract of two ounces of hops, or its equivalent in other aromatic or bitter tonics, will be sufficient, which proportion, however, may be changed to suit the customers, or to imitate a certain kind of malt liquor, such as lager-beer, ale, porter, and the like.

To secure the condition of stability in the resulting beverage it is necessary that the "wort" contain at least one-tenth per cent. of free acids, (besides the carbonic acid,) and if this percentage is not already attained by the acidity found at the end of the mashing process, it must be supplemented by the addition of some other suitable acids to the wort. This wort is then rapidly cooled down by a tubular cooler, as commonly used in breweries, (which cooler must be surrounded by an air-tight cover,) to a temperature of from 35° to 40° Fahrenheit, and kept at this temperature in vats till the liquid becomes perfectly clear by forming a sediment, wherefrom it is carefully drawn off into suitable vessels ("casks") and therein charged with so much of chemically-pure carbonic acid that a pressure not exceeding one and one-third atmosphere is produced. This will cause the liquid to become turbid again; but it will in due time, and if kept invariably at the said temperature and under the said pressure, of itself resume its former clearness by depositing all substances incompatible with carbonic acid on the bottom of the vessel, which process of clarification may be hastened by the use of "isinglass fining" or of "shavings," or of both combined, as usually practiced in breweries. As soon as the liquid has become sufficiently clear the beverage may be finally drawn off for shipment, keeping constantly the same pressure of carbonic acid during the whole operation.

To prevent decomposition the atmospheric air must, from the moment the wort leaves the brewing-kettle till the beverage is to be drawn off for shipment, either be entirely excluded from access to the liquid, or only be admitted through disinfected and pressed cotton-wool, thus intercepting the germs of decomposition floating in the air; and, furthermore, all vessels, pipes, and apparatuses through which the liquid will pass must be scrupulously kept clean by the use of suitable antiseptic and anti-zymotic agents.

In thus carrying out my invention I do not limit myself to any specific *modus operandi*, or to the use of any particular apparatus, and while a great variety of cereals and aromatic or bitter tonics may be found useful, and actually used by me, to derive therefrom the nutrient and tonic properties of my compound beverage, I prefer barley-malt and hops, and for the acidification of the wort, in case of necessity, I prefer tartaric or phosphoric acid.

I am aware that malt liquors have been treated with carbonic-acid gas under pressure to clarify them by precipitating the incompatibles.

I am also aware that in the manufacture of non-alcoholic effervescent beverages use has been made of a combination of carbonic acid with saccharine matter and some other substances which may be considered aromatic or bitter tonics. The saccharine matter, however, used for these drinks, generally known as "pops" or "soda-beers," is prepared either from cane-sugar, or from the commercial glucose or grape-sugar produced by the action of acids on starch or starchy matter, and in both cases no albuminoid or nitrogenous substances, at least not in a safe state, enter into said compounds; but I am not aware that extracts of cereals malted or acted upon by malt have ever been used in combination with carbonic acid in the composition of non-alcoholic beverages in such a manner that all insoluble nitrogenous substances or albuminoids incompatible with carbonic acid shall be entirely removed, or that in any of these beverages all soluble constituents of cereals, especially the albuminoids, were ever represented, or that a non-alcoholic malted beverage having the usual appearance of lager-beer, ale, porter, or the like, has ever been manufactured; and it is properly the leading feature of my compound beverage that the cereal extract which forms its main ingredient is obtained by the diastatic action of malt, thus securing for the resulting beverage—besides the saccharine matter and the other carbohydrates and the phosphates—the presence of all soluble albuminoid substances in an easily-digestible state, and even to a far greater extent than they are represented in the most substantial malt liquors, from which a considerable part of these valuable substances are removed by the formation of yeast and alcohol during the process of fermentation.

What I claim as my invention, and desire to secure by Letters Patent of the United States, is—

A nutrient and tonic compound beverage to be used as a non-alcoholic substitute for malt liquors—such as beer, ale, porter, and the like—consisting of an extract of cereals malted or acted upon by malt, retaining all albuminoids compatible with the presence of carbonic acid, an extract of hops or other aromatic or bitter tonics, and of carbonic acid, the beverage having the usual appearance of lager-beer, ale, porter, or the like, all substantially as set forth.

CHARLES H. FRINGS.

Witnesses:
WM. WHIST,
EDWARD H. MAKK.